United States Patent [19]

Nadler

[11] 4,418,362
[45] Nov. 29, 1983

[54] METHOD AND DEVICE FOR IMAGE ANALYSIS

[76] Inventor: Morton Nadler, 17 Les Huppes, 78170 La Celle Saint Cloud, France

[21] Appl. No.: 335,087

[22] Filed: Dec. 28, 1981

[30] Foreign Application Priority Data

Jan. 2, 1981 [GB] United Kingdom ............... 8100033

[51] Int. Cl.³ ............................................. H04N 1/10
[52] U.S. Cl. .................................. 358/293; 358/213; 358/267; 382/59
[58] Field of Search .............. 358/199, 213, 212, 288, 358/293, 264, 267; 382/59; 250/566, 567, 568

[56] References Cited

U.S. PATENT DOCUMENTS

| | | | |
|---|---|---|---|
| 3,976,973 | 8/1976 | Martin et al. | 382/59 |
| 4,260,979 | 4/1981 | Smith | 382/59 |
| 4,327,377 | 4/1982 | Takken | 358/199 |

*Primary Examiner*—Tommy P. Chin
*Assistant Examiner*—Edward L. Coles
*Attorney, Agent, or Firm*—Bucknam and Archer

[57] ABSTRACT

A device for image analysis comprising scanner (1) for producing a video signal indicative of the light intensity received at successive regular time intervals from an image scanned along a first direction at an automatically controlled known motion velocity and along a second direction at an unknown motion velocity, characterized in that it further comprises circuits (2,5) for determining a reference contrast value from the difference between light intensities received from points of the image scanned along the first direction, circuits (3,6) for determining a variable contrast value from the difference between light intensities received from points of the image scanned along the second direction, circuit (7) for comparing the variable contrast value with the reference contrast value, and circuits (8,10) for using the comparison for compensating for the unknown motion velocity in the production of the video signal.

8 Claims, 5 Drawing Figures

METHOD AND DEVICE FOR IMAGE ANALYSIS

BACKGROUND OF THE INVENTION

The invention relates to the compensation of variable velocity in scanners used for image analysis, and particularly optical lecture, such scanners comprising means for producing a video signal indicative of the light intensity received at successive regular time intervals from an image scanned along a first direction at an automatically controlled known motion velocity and along a second direction at an unknown motion velocity.

Applications for optical scanning are known in which one of the scan directions is supplied by the relative motion between a scanning head and the scanned medium. Where the relative velocity is fixed and known, the scanning head may be in the form of a linear array of photodetectors on which a narrow slit-shaped portion of the scanned medium is focussed, the long axis of the array being perpendicular to the direction of the relative motion. The sampling rate of the array is controlled by a clock pulse in the well known manner at a frequency such that successive column starts of the scan occur when the incremental distance travelled by the head relative to the scanned medium is one notional column of the discrete raster into which the image of the scanned medium is decomposed. However, when the relative velocity is unknown, as is the case, for example, with handhold scanners (sometimes called optical wands), this technique will not yield a useful raster since it will result in distorted images.

A known technique for rendering optical wands independent of the relative velocity of the scanning head with respect to the medium uses a two-dimensional (rectangular) array of photodetectors. The rate of sampling of the two-dimensional array is made sufficiently high that the entire array is sampled several times during the passage of the array over a single printed symbol to be analysed, and logic means are supplied for selecting one, best image among the multiple set of images obtained for each single scanned symbol. This technique presents multiple disadvantages. Among these are the following:

1. The rate of sampling must be exceedingly high, resulting in excessive signal-handling requirements and reduced signal/noise ratio;
2. Even at the highest sampling rates the array size is strictly limited by this speed requirement, so that either the height of the array or the width is insufficient, or both; insufficient height leads to excessively tight requirements on the vertical position of the scanner with respect to the scanned line of print, while insufficient width restricts the range of applications of the device;
3. Even at the highest feasible electronic sampling rate the requirement for multiple complete samplings of the array limits the maximum linear velocity of the scanning head with respect to the medium to values that are not compatible with ergonomic considerations; in particular, for some individuals the manipulation of the device may appear to be too slow and deliberate for comfortable utilisation;
4. The cost of a photodetector matrix is high compared with that of a simple linear column array, and the logic associated with choice of best image is costly and not always successful.

Another scheme that has been tried is to roll a wheel along the scanned medium, which wheel drives a miniature tachometer that in turn controls the column scan rate. This also fails for ergonomic reasons and has not been found to be a commercial success.

SUMMARY OF THE INVENTION

The invention proposes a method and a device which avoid the above drawbacks due to determining a reference contrast value from the difference between light intensities received from points of the image scanned along said first direction, determining a variable contrast value from the difference between light intensities received from points of the image scanned along said second direction, comparing said variable contrast value with said reference contrast value, and using said comparison for compensating for said unknown motion velocity in the production of the video signal. Referring to FIG. 1, 1 is a scanning head containing a linear column array of photodetectors, sampled at a rate defined by clock pulses t. The object of the present invention here is to supply a means for approximate correction or compensation of varying values of relative velocity between a single-column array of photodetectors and a scanned medium, where the array is placed perpendicular to the direction of relative motion, the relative motion being of unknown velocity. It is assumed that during the short time of actual scan of the medium the inertia of the scanning device is such that the relative velocity of the system does not vary greatly; it is also assumed that the further utilisation of the resulting raster is such that slight errors in compensation of relative motion have little or no effect on the final result of operation of the entire system in which the present invention is used.

The invention will be further explained by means of a specific embodiment which will be described with reference to the attached drawings.

DESCRIPTION OF THE PREFERRED EMBODIMENT

Figure 1:
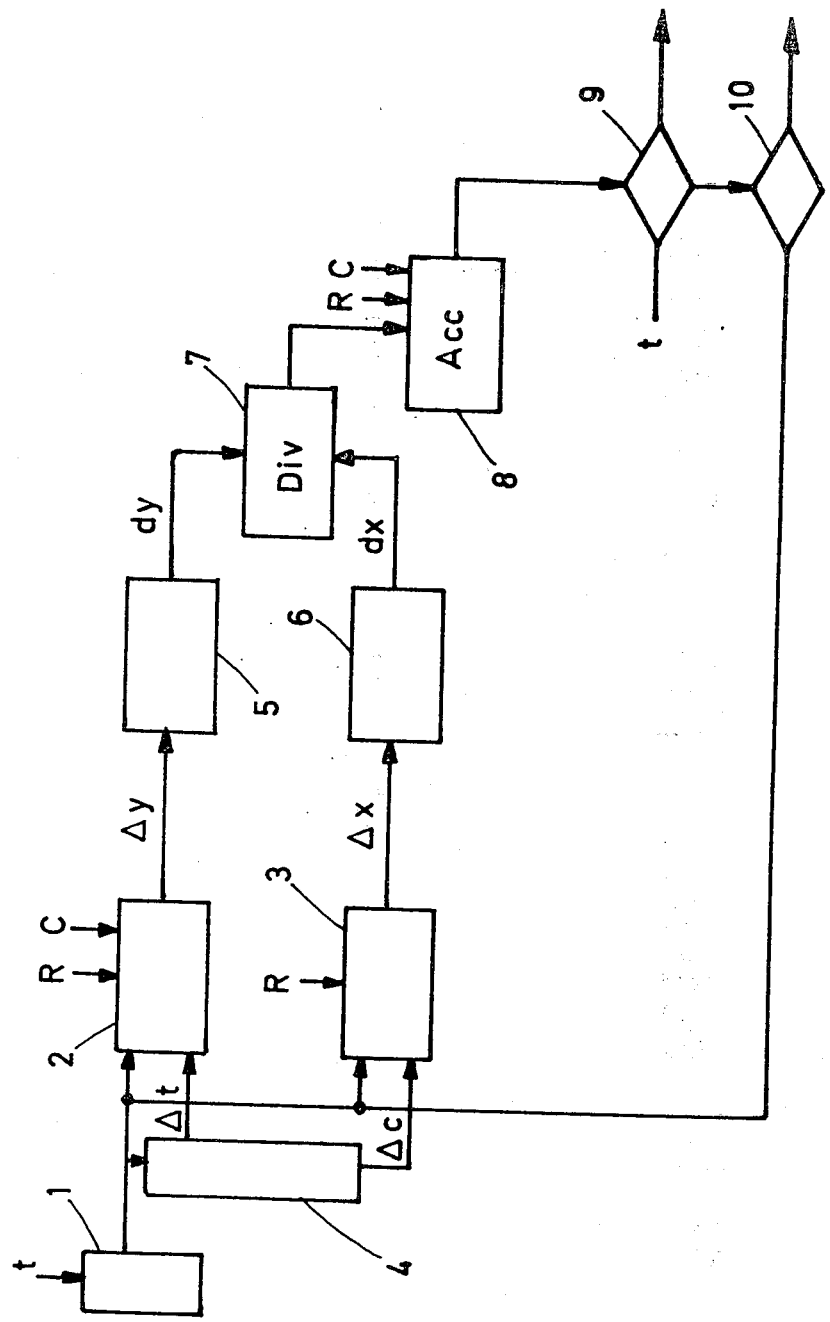
FIG. 1 is a block diagram of one electronic system producing the corrected raster.

The scanning head 1 supplies a digital (numerical) video signal to one input of each of two numerical differencing circuits 2, 3, which each comprise a well-known digital adder-subtractor integrated circuit module, and to the input of a digital delay line 4. The second input of the differencing circuit 2 is connected to an output of the delay line 4 supplying a unit time delay $\Delta t$ and the second input of the differencing circuit 3 is connected to an output of the delay line 4 supplying a unit column delay $\Delta C$. $\Delta t$ is equal to the time interval between each successive clock pulses, or the sampling rate for the points viewed successively by each detector in the series of N detectors in a column, whereas $\Delta C$ is for instance equal to NΔt and is the column rate, or time interval between two successive column start pulses C' causing detection by the series of detectors.

The output of the circuit 2 is connected to a maximum detecting circuit 5 and the output of the circuit 3 is connected to another maximum detecting circuit 6. The outputs of the maximum detecting circuits are connected to respective inputs of a division circuit 7. If we call the output of maximum circuit 5 dy and the output of maximum circuit 6 dx, the output of the divider circuit 7 is dx/dy. The output of the divider circuit is connected to the input of an accumulator circuit 8, which is controlled by clock pulses C at the column rate. The accumulator output is a pulse each time the current addition causes the value stored in the accumulator to reach or exceed 1. This pulse controls two gates 9 and 10 that pass numerical video and clock pulses t during one column time to the logical circuits that utilise the velocity-compensated video. At the start of operation the circuits 2, 3 are reset to zero and the value stored in the accumulator is set to 0.5. After each output pulse from the accumulator the value stored in it is the fractional remainder after 1 is subtracted, which takes place automatically in standard accumulators if the carry out pulse is arranged to have the value 1.

Figure 2:
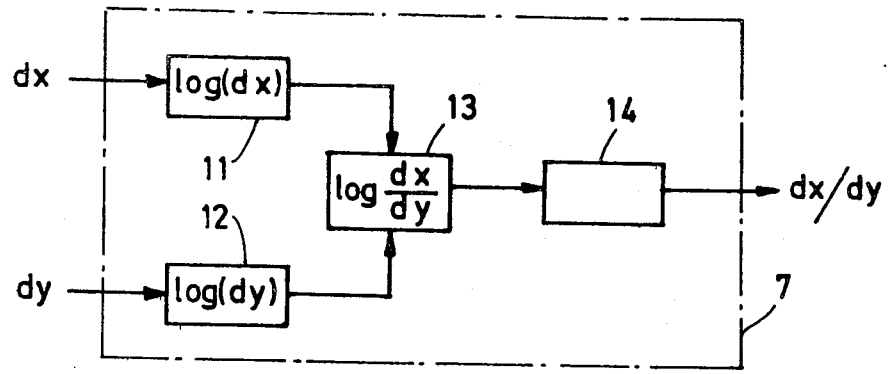
FIG. 2 is the detailed block diagram of a portion of the system.

Referring now to FIG. 2, the divider circuit 7 in the specific embodiment described, consists of logarithmic converters 12, 11, converting dy and dx respectively to log (dy) and log (dx). The difference of lagarithms is computed by an adder-subtractor module 13 and applied to the input of an antilogarithmic converter 14. The converters 11, 12, 14 may be read-only memory (ROM) devices, which have the property of supplying an arbitrary predetermined numerical value for each possible numerical value at the input.

Figure 3:
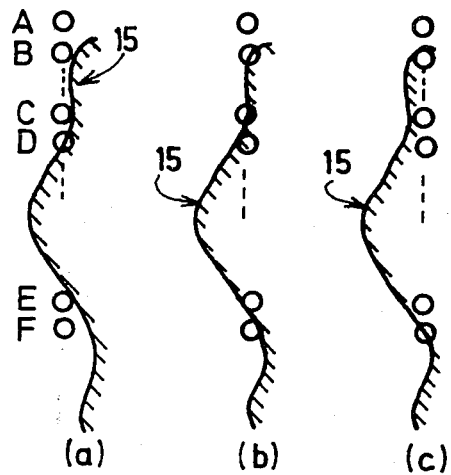
FIG. 3 is used to explain in part the dynamic functioning of the system.

For each successive value of video obtained from the photodetector array 1 the circuit 2 computes the difference with respect to the last value received by virtue of the time delay Δt. FIG. 3 represents schematically three successive positions of the photodetector array with respect to a scanned medium, where a contrast edge 15 is shown, together with three selected pairs of photodetectors A, B; C, D; E,F. The differences computed by the circuit 2 are the absolute values of the differences successively of each possible pair of video signals by virtue of the time delay Δt, for example, $|V(A)-V(B)|$, $|V(C)-V(D)|$, etc . . . , where V(X) is the value of the video sampled at the position X. In the general case we may write $$\Delta y(n) = |V(n) - V(n-1)| \quad (1)$$

where Δy(n) is the value of the difference Δy at the n-th position along the photodetector column. The index n runs from 0 to N, if the total number of photodetectors in the column is N+1. To prevent spurious effects, the column start pulse C is used to inhibit computation of Δy(0)=V(0)−V(N).

The differences computed by the circuit 3 are the absolute values of the difference of the last value received and the value received at the same position in the preceding column by virtue of the time delay C. Referring to FIG. 3, these are the differences of values sampled by the same photo-detector in successive positions of the column array with respect to the medium, for example (a), (b), and (c). In the general case we may write $$\Delta x(n) = |V(n,c) - V(n,c-1)| \quad (2)$$

where c−1, c are successive column scans.

At nominal maximum velocity the clock t and the column start pulse C are set so that successive sampled columns are adjacent to each other, at the same pitch as the successive detectors in a column. If the distribution of contrast differences of the scanned medium is isotropic the contrast differences in this case in the x direction will have the same distribution of values as the contrast differences in the y direction. If the linear velocity in the x direction is less than the nominal maximum the successive sampled columns will overlap, for example, as between FIGS. 3(a) and (b) or (b) and (c), down to total overlap in the x direction at zero velocity. This will have the effect of reducing the values of Δx, the greater the reduction of Δx, the greater the reduction in velocity.

The maximum detecting circuits function in the following manner. The first value after start of operation is 0 by virtue of the reset pulse R. This value is stored in an internal register. Each new value of the differences Δx, Δy received at the respective inputs is compared with the stored value and if it is greater, it replaces the stored value. Thus, at every clock time the circuits 5, 6 will store the absolute values of the largest differences Δy, Δx measured since the last reset. Let us call these stored values dy and dx respectively. The circuit 7 computes at each instant the ratio dx/dy, which is normally not greater than 1. If it should exceed 1, it is forced to the value 1. Therefore the output of the divider circuit 7 is a number equal to or smaller than 1. This number is applied to the input of the accumulator 8 and added to the current contents of the accumulator once every column, for example under control of the same column start pulse C that was used to inhibit circuit 2. The accumulator will be set to overflow every time that its contents reach or exceed 1, and the new value will be the remainder after substration of the unit overflow, an operation that takes place automatically if a standard binary adder-subtractor integrated circuit module is used for this circuit. The overflow pulse will be held during one column) and is used to open gates 9, 10, allowing one column of video and the corresponding clock pulses t to be transmitted to the subsequent logic circuits.

Letting v represent the actual velocity and v(max) the nominal maximum velocity a linear relationship between dx and v would imply that $$dx/dx(max) = v/v(max) \quad (3)$$

where dx(max) is the value of dx observed at v(max). Then we see that the accumulator computes $$\Sigma(dx/dy) = X \quad (4)$$

where X is the total distance traversed. The overflow represents constant increments of distance, equal to the nominal column displacement at v(max) if dx(max)=dy. We see that in ideal operation the differences Δy are defined by the array geometry and are independent of ν, while the differences Δx depend on the degree of overlap of successive columns. The law (4) will be exact if $$dx(max) = dy \quad (5)$$

which would be the case for ideal geometry of the scanner array and isotropy of contrast, except for an initial transient which depends on the particular shapes of the scanned graphic symbols.

In the general case, variations due to anisotropy of the scanned medium, scatter in the photodetector characteristics, random noise in the sampled video signals, etc. will cause deviations from the ideal relationship (5) and therefore law (4) should read $$\Sigma dx/dy = X(1 \pm \epsilon) \qquad (4')$$

where $\epsilon$ is a measure of the error.

Figure 4:
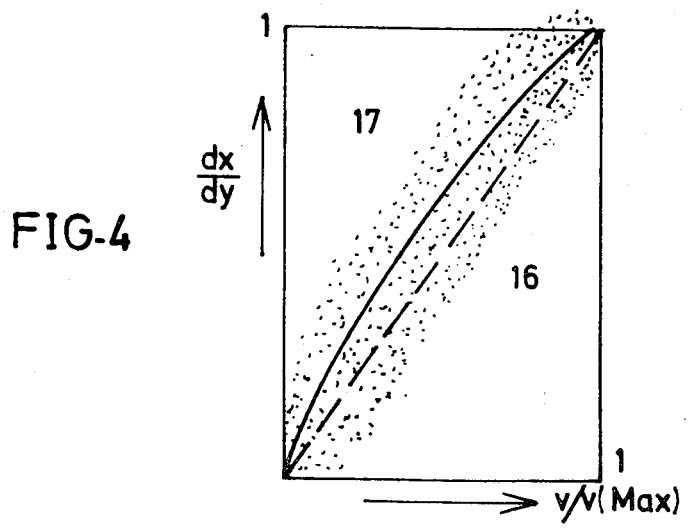
FIG. 4 is a typical scatter diagram of the two principal parameters of the system.

FIG. 4 represents what could be an actual situation. Here the individual points represent experimentally observed pairs of values dx/dy and v/v(max) for a large variety of scanned documents and at all possible values of v. The theoretical relationship (4) is indicated by the dashed line 16, the curve 17 represents one possible law offering a compromise relation with respect to the experimentally observed points. When the divider circuit utilises ROM tables and logarithm-antilogarithm laws, the compromise law 17 can be easily conformed with by suitable modification of the values supplied by the table 14.

It will be obvious that if numerical values of finite resolution are used, as such is the case for digital circuits, the range of velocities for which useful corrections can be obtained will depend on the number of places to which the numerical values are measured and the accuracy of those measurements. If the values of measured video have a tolerance $\tau$ the maximum range of velocity variation that can be corrected by this system will be of the order of magnitude 1:$\tau$. For example, if $\tau$ has the value 5%, the maximum range of velocity variation that can be corrected will be of the order of 20:1.

If the relative velocity of the scanning head with respect to the scanned medium is variable, means can be supplied for periodic resetting of the maximum detecting circuits 5,6 during operation, instead of restricting reset to start of operation. Then means are provided to alter the values of dx, dy gradually from the old to the new values, to prevent intermediate transient fluctuations of the value of dx/dy. Such means can consist, for example, in decrementing both log (dx) and log (dy) by constant values from time to time, which does not affect the difference log (dx)−log (dy). Then the values of log (dx) and log (dy) can be updated by new, non decremented values when the values of dx and dy found since the last reset operation give log values that are greater than the stored decremented values.

Figure 5:
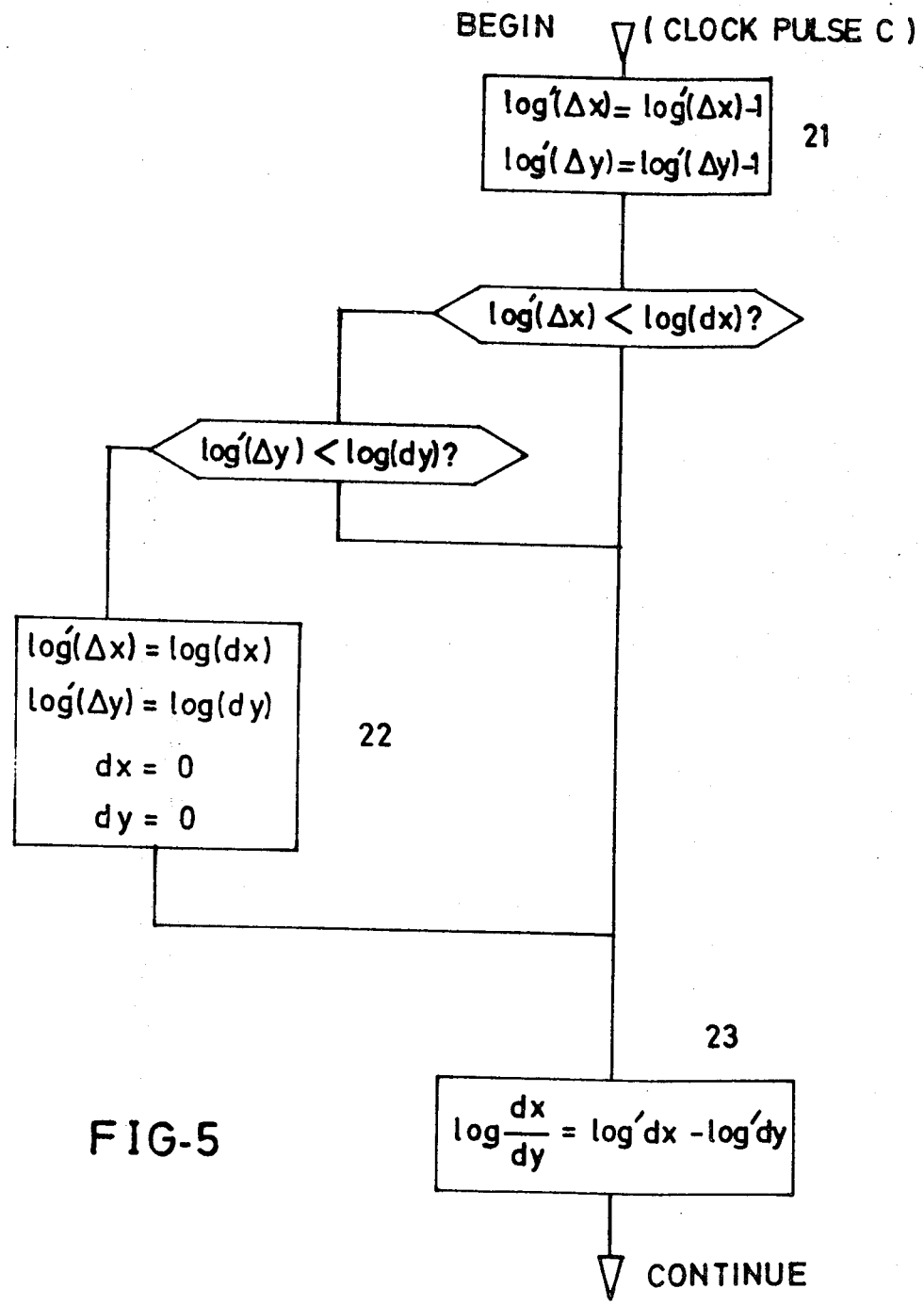
FIG. 5 is a flowchart of a particular circuit used in a variant of the invention.

FIG. 5 shows the flowchart of an embodiment of this correction means, using a microprocessor. It is understood that dx and dy are the maximum values found since the last up dating of these variables, and $\Delta x$, $\Delta y$ are the decremented values of the same. At 21 both log ($\Delta x$) and log ($\Delta y$) are decremented by 1, reset occurs at 22 and log difference is calculated at 23. Decrementation may be performed repetedly, at regular time intervals every time the signal has passed a predetermined number of columns.

Other variants and other implementations of the velocity correction device according to the invention will be obvious to specialists in the art from the above description.

What is claimed is:

1. A method for image analysis comprising producing a video signal indicative of the light intensity received at successive regular time intervals from an image scanned along a first direction at an automatically controlled known motion velocity and along a second direction at an unknown motion velocity, characterized in that it further comprises determining a reference contrast value from the difference between light intensities received from points of the image scanned along said first direction, determining a variable contrast value from the difference between light intensities received from points of the image scanned along said second direction, comparing said variable contrast value with said reference contrast value, and using said comparison for compensating for said unknown motion a velocity in the production of the videosignal.

2. A method according to claim 1, characterized in that said reference contrast value and/or said variable contrast value are determined as being the maximum found during a scanning step among the respective said differences between each two successively scanned points along the respective said directions.

3. A method according to claim 2 further comprising resetting said determination of maximum values for said comparison.

4. A method according to claim 1, characterized in that said comparison comprises calculating the ratio from said variable contrast value to said reference contrast value for each periodically scanned point along said second direction, said method further comprising accumulating the successively calculated ratios or predetermined numbers connected thereto up to a predetermined value and sampling the light intensities received to produce the video signal each time said predetermined value is reached.

5. A method according to claim 4 wherein the image is ideally isotropic in maximum contrasts and said predetermined value is 1.

6. A device for image analysis comprising means (1) for producing a video signal indicative of the light intensity received at successive regular time intervals from an image scanned along a first direction at an automatically controlled known motion velocity and along a second direction at an unknown motion velocity, characterized in that it further comprises means (2,5) for determining a reference contrast value from the difference between light intensities received from points of the image scanned along said first direction, means (3,6) for determining a variable contrast value from the difference between light intensities received from points of the image scanned along said second direction, means (7) for comparing said variable contrast value with said reference contrast value, and means (8,10) for using said comparison for compensating for said unknown motion velocity in the production of the video signal.

7. A device according to claim 6, characterized in that said means for producing a video signal and for scanning the image comprise a scanning head (1) provided with a series of light intensity detectors aligned along said first direction, said head being manually deplaceable along said second direction.

8. A device according to claim 7, characterized in that it comprises means to produce periodic sampling pulses and periodic column start pulses, a first circuit (2,5) to determine the difference between the signal intensities detect ted at successive sampling pulses and a maximum value thereof, a second circuit (3,6) to determine the difference between the signal intensities detected at successive column start pulses and a maximum value thereof, means (7) to determine the ratio between the maximums from said first and second circuits at the rate of said column start pulses and accumulating means (8) for said ratios allowing the signal to pass for one column time interval every time the accumulated ratios amount a predetermined value.

* * * * *